United States Patent [19]
Didelot et al.

[11] Patent Number: 5,167,757
[45] Date of Patent: Dec. 1, 1992

[54] APPARATUS FOR THE ASSEMBLY BY PRESSURE OF LAMINATED GLASS PLATES

[75] Inventors: Claude M. Didelot, Thourotte; Gilles M. Wattiau, Baboeuf, both of France

[73] Assignee: Saint-Gobain Vitrage International, Courbevoie, France

[21] Appl. No.: 665,648

[22] Filed: Mar. 7, 1991

[30] Foreign Application Priority Data

Mar. 8, 1990 [FR] France .................. 90 02921

[51] Int. Cl.$^5$ .......................................... B32B 31/20
[52] U.S. Cl. .................................... 156/582; 156/106; 100/155 G
[58] Field of Search .............. 156/580, 582, 99, 102, 156/103, 106, 555; 100/93 PR, 155 G

[56] References Cited

U.S. PATENT DOCUMENTS 2,983,635  5/1961  Richardson ................ 156/102

Primary Examiner—Michael W. Ball
Assistant Examiner—Francis J. Lorin
Attorney, Agent, or Firm—Oblon, Spivak, McClelland, Maier & Neustadt

[57] ABSTRACT

An apparatus for the assembly by pressing of a laminated glass plate includes at least one assembly extending transversely of the pressing rollers (3) mounted at the end of rods (8) of at least one group of jacks (9) and in which the jacks (9) of the group are arranged in alternating manner in at least two subgroups (10, 11) in at least two different planes.

8 Claims, 5 Drawing Sheets

APPARATUS FOR THE ASSEMBLY BY PRESSURE OF LAMINATED GLASS PLATES

BACKGROUND OF THE INVENTION

1. Field of the Invention

The present invention relates to the manufacture of laminated glass plates or glazings and in particular to an apparatus for the assembly of the components of a laminated glass plate by pressing and in particular by calendering, i.e. by passing the stack of said components, which is also referred to by the term glazing in the remainder of the description, between upper and lower pressing means.

2. Description of the Related Art

The known calendering apparatus, e.g. described in French patent 2 053 104, are generally equipped with two series or rows of pressing rolls or rollers. One series of lower rollers are arranged in juxtaposed manner and their position can be regulated independently so as to obtain a curvature corresponding to the desired transverse curvature, which is generally the mean or average curvature of the glazing. A series of upper rollers is arranged substantially in the same way. In the known apparatuses, each of the two series of rollers is mounted on a transverse beam belonging to a frame able to pivot about a horizontal axis, the assembly constituting a moving means, in such a way that the rollers remain substantially perpendicular to the glazing throughout the assembly operation.

During the passage of the glazing or glass plate between the rollers, the position of the latter must vary in order to follow changes in the transverse curvature of the glazing. To this end, European patent 0 189 345 proposes a calendar using pneumatic jacks giving the rollers a considerable flexibility in following the curvature of the glazing. In this so-called "floating" calender, the compression chambers of the jacks of the upper rollers and those of the jacks of the lower rollers are linked and the pneumatic pressure exerted on a pressing or pressure roller is equal to that exerted on a back-pressing or back-pressure roller.

These apparatuses are generally suitable for the assembly of glass plates having a relatively small and regular transverse cambering which is substantially the same over the entire length of the glazing. However, in the case of glazings with more complex shapes, particularly those having a very deep cambering in the transverse section and/or irregular over the length of the glazing, said apparatuses are not always satisfactory, because they are not sufficiently flexible to be able to follow all the large curvature modifications. If the pressure of the rollers is inadequate, there occurs an inadequate or only slightly homogeneous adhesion of the components of the glazing or, conversely, if the pressure is too high the glazing may fracture.

In order to increase the flexibility of the apparatus, Applicant has proposed using rollers having a limited width, while increasing their number. However, this proposal leads to another problem, namely that of increased overall dimensions of the pneumatic jacks juxtaposed in the vertical plane passing through the pressing line.

SUMMARY OF THE INVENTION

The invention has as an object a modification which obviates the aforementioned disadvantages.

The invention proposes an apparatus for the assembly by pressure or pressing of symmetrical or asymmetrical laminated glass plates or glazings able to operate both on glazings having a regular and relatively small double cambering and on glazings having complex shapes and which can have irregular and/or very pronounced camberings. The term cambering means, according to the invention, a glazing having both a longitudinal curvature and a transverse curvature. The term symmetrical laminated glass plates means, according to the invention, laminated glass plates, whose two faces are constituted by rigid sheets, such as glass sheets. The term asymmetrical laminated glass plates is understood to mean laminated glass plates formed from a laminated or monolithic rigid support and a flexible, plastic sheet having the desired properties, e.g. the asymmetrical glass plates described in French patent 2 398 606 and European patents 0 132 198 and 0 131 523.

The above and other objects are achieved according to the present invention by an apparatus for the assembly of laminated glazings by pressing. The apparatus includes a frame and at least one set of pressing rollers extending in a direction crosswise to a direction of movement of the glazings relative to the apparatus. A plurality of jacks mounted to the frame are connected to the pressing rollers for pressing the pressing rollers onto the glazing. The jacks are arranged in at least two groups, each of the groups lying in mutually different planes which are non-coplanar with a vertical plane including the pressing rollers.

According to an embodiment of the apparatus according to the invention, the latter comprises an assembly of pressing rollers and an assembly of back-pressing rollers mounted at the end of the rod of pneumatic jacks, whereby in the case of the pressing rollers and also the back-pressing rollers, the jacks are at least partly located in at least two different planes and in alternating manner.

Advantageously the pressure chambers actuating the facing rollers are connected in such a way that each pressing roller is in pressure equilibrium with the facing back-pressing roller.

By closely positioning the jacks in different planes and in alternating manner, both with respect to the jacks operating the pressing rollers and the jacks operating the back-pressing rollers, the problem of the overall dimensions is solved and it is also possible to increase the number of jacks for the same pressing assembly and consequently increase the number of rollers, so that it is consequently possible to reduce the width and improve pressing.

The arrangement in alternating manner and in different planes can be used for all the jacks of a pressing roller assembly.

In a variant, this arrangement is only used in sections, said section or sections corresponding to the location or locations of the pressing rollers acting on the parts of the glazings having difficult curvatures, such as very marked and deep curvatures.

According to an embodiment of the apparatus according to the invention, the pressing assemblies and in particular the jacks of a same series or same assembly of rollers are placed in two symmetrical planes inclined with respect to the plane of the frame on which the pressing elements are mounted. The term pressing element is understood to mean the roller, the jack which controls it and the different intermediate means between the roller and the jack. The plane of the frame corresponds to the mean pressing plane. It is also the vertical plane when the frame is in the equilibrium position. The two inclined planes pass through the mean pressing line, which also corresponds to the pivoting axis when the frame pivots.

The inclination of the planes containing the jacks is dependent on the overall dimensions of the jack bodies and also the length of the jack rods. Generally, an inclination of 10° to 20° on either side of the vertical plane is adequate.

In a variant, some of the jacks of the same assembly of pressing rollers are placed in the vertical plane passing through the pressing line and the others are arranged so as to alternate with the first in a plane inclined with respect to the vertical plane.

In another variant, the jacks of the same assembly of rollers are located in alternating manner in three planes, namely two inclined planes and a median vertical plane.

Although the action of the jacks is no longer exerted in the same pressing plane, it is still possible to correctly carry out the calendering operation to the extent that the angle formed by the pressing force with the direction normal to the face of the glazing to be calendered is not very large. The direction normal to the face of the glazing to be calendered is generally contained in the mean pressing plane. Conversely, for larger jack inclination angles, 45° and more with respect to the pressing plane, it is then necessary to transmit the action of the inclined jacks to the rollers via intermediate members and articulations. In another embodiment of the invention the jacks alternate in at least two vertical planes, at least one of these differing from the vertical plane passing through the pressing line. The action of the jacks located in the plane or planes differing from the planes passing through the pressing line is then transmitted to the rollers via the intermediate members and articulations in the manner described hereinbefore.

According to an advantageous feature of the invention, each jack actuates a pair of rollers via a joint including an articulation system, such as a parallelogram system, permitting the relative movement of one roller compared with the other in the pressing direction.

When the jacks used are balanced pressure diaphragm jacks, it is possible to advantageously provide at least the rod of the lower jacks with a pneumatic or mechanical spring in order to compensate for the weight of the pressing elements and/or ensure the maintaining of the desired length for the rod of the jacks.

According to a feature of the apparatus according to the invention, the assembly of upper pressing rollers and the assembly of lower pressing rollers form part of a moving means, which is itself mounted on means making it pivot substantially about the pressing line. It is also advantageous if the means making it pivot also serve to give the moving means the possibility of vertical displacement in accordance with a raising-lowering movement. A moving means mounted so as to pivot and which vertically slides is, e.g., described in European patent 0 290 344.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
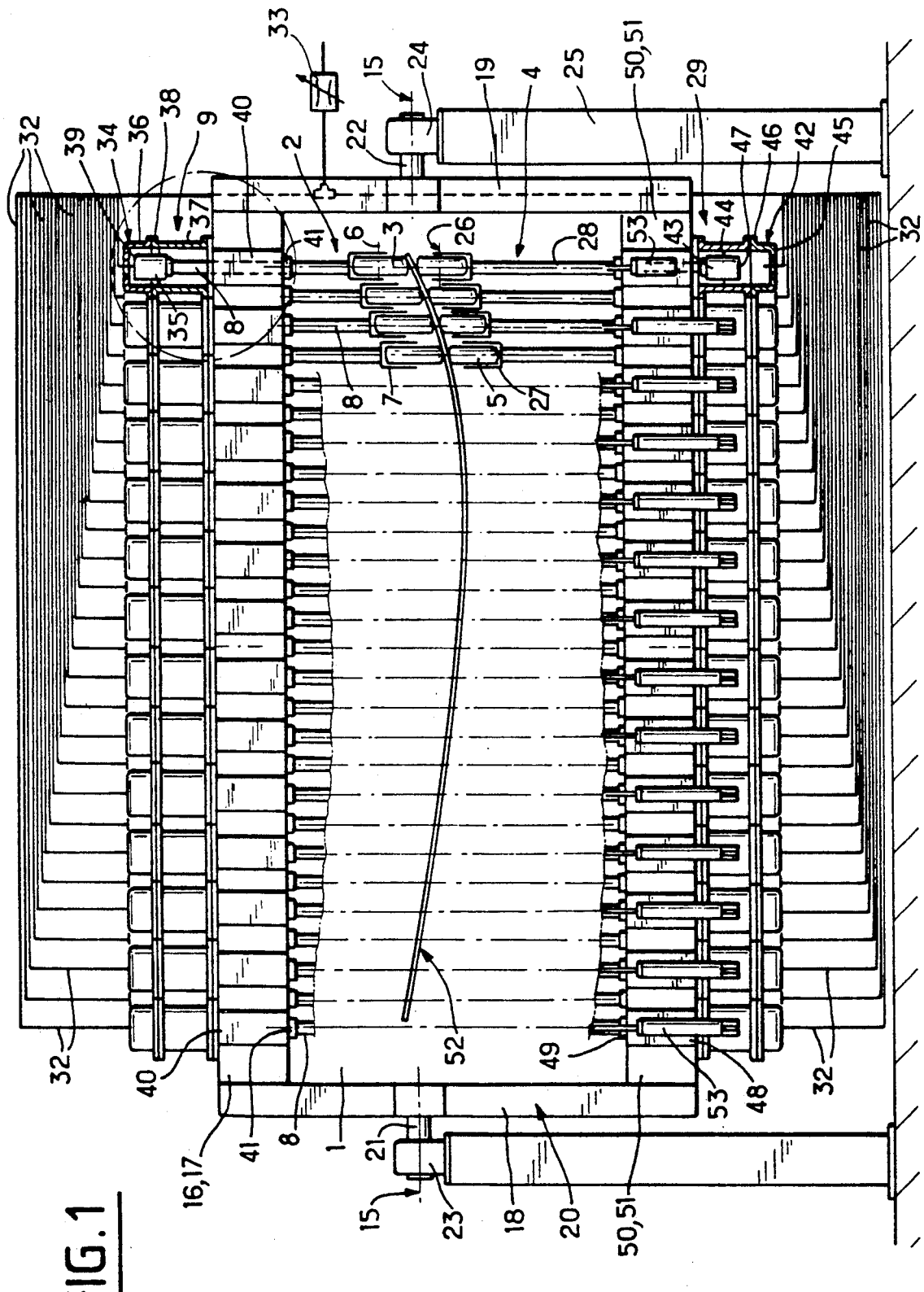
FIG. 1 is a front elevation of a construction of an apparatus incorporating an assembly of upper pressing rollers and an assembly of lower pressing rollers, said rollers being mounted in alternating manner in accordance with two symmetrical planes inclined with respect to the vertical plane of equilibrium of the frame.
Figure 2:
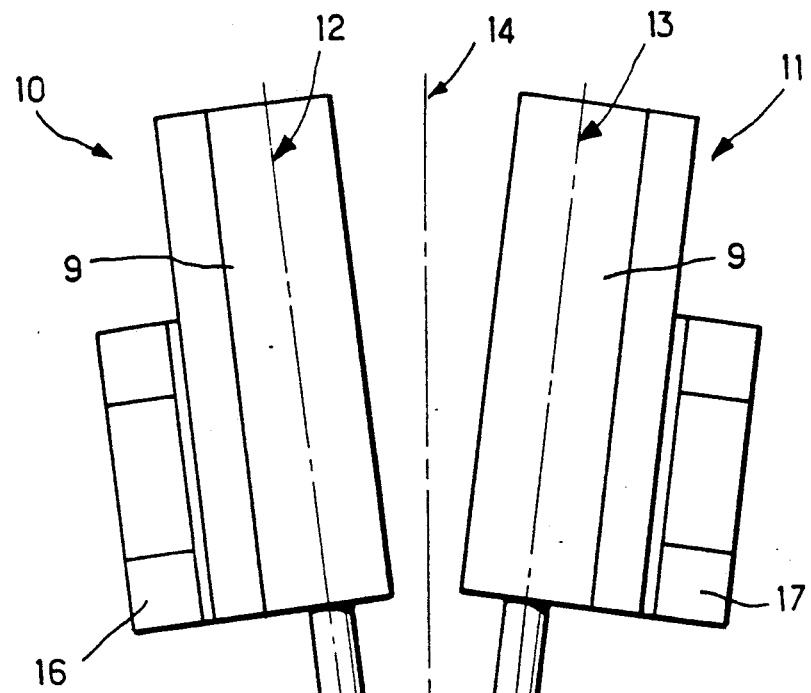
FIG. 2 is a side view of two assemblies of upper pressing rollers, mounted in alternating manner, of the apparatus of FIG. 1.
Figure 2:
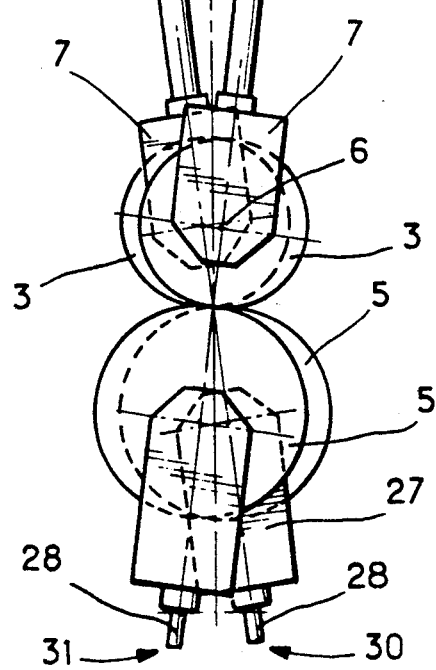

The apparatus shown in FIG. 1 and in FIG. 2 (which is a partial, larger scale, side view of the structure of FIG. 1) comprises a moving means 1 equipped with an upper pressing assembly 2 having upper pressing rollers 3 and a lower pressing assembly 4 having lower pressing rollers 5 (all the rollers not being shown). The upper rollers 3 are mounted so as to rotate about axes 6 carried by the fork ends 7 placed at the end of the rod 8 of the diaphragm pneumatic jacks 9 described in greater detail hereinafter.

The rollers upper 3 and their jacks 9 are grouped into two subassemblies 10, 11 whose elements alternate. The alternating subassemblies are located in alternating (mutually different) planes 12, 13 inclined with respect to the vertical plane 14 in the equilibrium position of the moving means 1. The two planes 12, 13 are each inclined by an angle of approximately 15° on either side of the vertical plane 14 and pass through the pivoting axis 15 of the moving means.

The two jack subassemblies 10, 11 belonging to the assembly of upper pressing rollers 3 are mounted on two parallel, horizontal beams 16, 17 carried by the two posts 18, 19 of a mobile frame 20, mounted on two aligned horizontal shafts 21, 22 rotating in bearings 23, 24 carried by the base 25. In an unillustrated construction of the apparatus, it is possible to provide an arrangement of horizontal shafts permitting a raising-lowering movement of the mobile frame with respect to the base.

The lower rollers 5 are in the same way installed so as to rotate about the axes 26 carried by the fork ends 27 placed at the end of the rods 28 of the diaphragm pneumatic jacks 29 and grouped into two subassemblies 30, 31 placed in the two inclined planes 12, 13 containing the upper rollers and their mounting assemblies with their pneumatic jacks 9.

The assembly of lower rollers 5 comprises at least one motor roller driven by means of a transmission system via a motor (not shown), which is advantageously positioned on the mobile frame 20 at a desired location and thus participates in the balancing of the moving means 1.

An advantageous apparatus for driving the motor rollers of a calender is, e.g., described in French patent application 88 14741. This apparatus comprises a fixed, non-deformable transmission shaft mounted on the mobile frame and which is connected to the motor by a chain or a belt and to each motor roller via a transmission system incorporating a bevel gear and an articulated assembly deformable in an essentially vertical direction. The deformable articulated assembly is advantageously formed by a substantially vertical shaft having two universal joints and a splined shaft.

The pneumatic pressure operating the pressing rollers is introduced with the aid of pipes 32 into the body of the jacks and the pressure can be regulated to a desired value via a valve 33 for each of the elementary means working in opposition with one another independently of the adjacent systems.

The pneumatic jacks used are those, e.g., described in European patent 0 189 345. Each jack 9 of the upper pressing assembly is formed by a cylindrical, pneumatic box 34 in which is displaced a piston 35 mounted on the upper end of the piston rod 8.

The pneumatic box 34 is formed from two parts 36, 37, which are bolted together via a flange assembly 38. Between the two flanges of the assembly is gripped a rubber diaphragm 39. The pneumatic pressure introduced by the pressure pipe 32 into the pneumatic box 34 acts on the diaphragm 39, which transmits the pressure to the piston 35. The pneumatic box is fixed to a bracket 40, which also serves as a support for a ball guide bush 41, in which the piston rod 8 slides with minimum losses by friction. The piston rod 8 is prevented in an adequate manner from rotating about its own axis. The individual brackets 40 for each jack subassembly are juxtaposed in alternating manner on the two parallel, horizontal beams 9, 10 belonging to the mobile frame 13.

Each jack 29 of the lower pressing assembly comprises, as in the case of the jacks described hereinbefore for the upper pressing assembly, a pneumatic box 42 in which is displaced a piston 43. The cylindrical pneumatic box 42 is formed from two parts 44, 45 connected by an assembly 46. Between the jacks of the assembly is gripped an elastic diaphragm 47, which transmits to the piston 43 the pneumatic pressure supplied to the pneumatic box by the supply pipe 32. The pneumatic box 42 is mounted on a bracket 48, which also serves as a mounting support of guiding the ball guide bush 49 in which the rod of the piston 28 slides without friction. The brackets 48 are juxtaposed in alternating manner on the two parallel, horizontal beams 50, 51 belonging to the mobile frame 13.

Under the effect of their own weight, each pressing roller 3 and the corresponding back-pressing roller 5 would always occupy a lower end position unless they are raised into an upper position by the laminated product 52 to be calendered. Following the passage of a laminated product 52 to be calendered, they would consequently all drop into their lower end positioned and would have to be partly raised by the rigid glass sheet with respect to the product 52 to be calendered. In this way, supplementary bending forces would act on the glass sheet. To avoid subjecting the glass sheet to such stresses, a pneumatic spring 53 is mounted between the fork end 27 and the bracket 48, said spring being dimensioned or regulated in such a way that the weight of the jacks and rollers is compensated. Use is advantageously made of a pneumatic spring 53 having a linear characteristic curve. As a result of the presence of the pneumatic spring 53, the regulating forces in the case of a position change of the pressing rollers are extremely small, so that the height position adaptation of the pressing rollers to the shape of the glass sheet only takes place when the glass sheet is introduced between the rollers and requires no supplementary adjustment measure. Following the passage of the glass sheet between the pairs of rollers, the pressing rollers remain in the height position which they occupied under the action of the raised glass sheet.

In a variant, it is possible to replace the pneumatic spring 53 by a mechanical spiral spring, which can be placed around the rod 28 of the jacks 29.

FIG. 2 better shows the arrangement of the two upper pressing subassemblies 10, 11 in two planes inclined with respect to the vertical plane, which is the plane of equilibrium of the apparatus. It can be seen that an angle of approximately 15° on either side of the vertical plane 14 is adequate for feeding the space necessary for the fitting of twice as many jacks.

Figure 3:
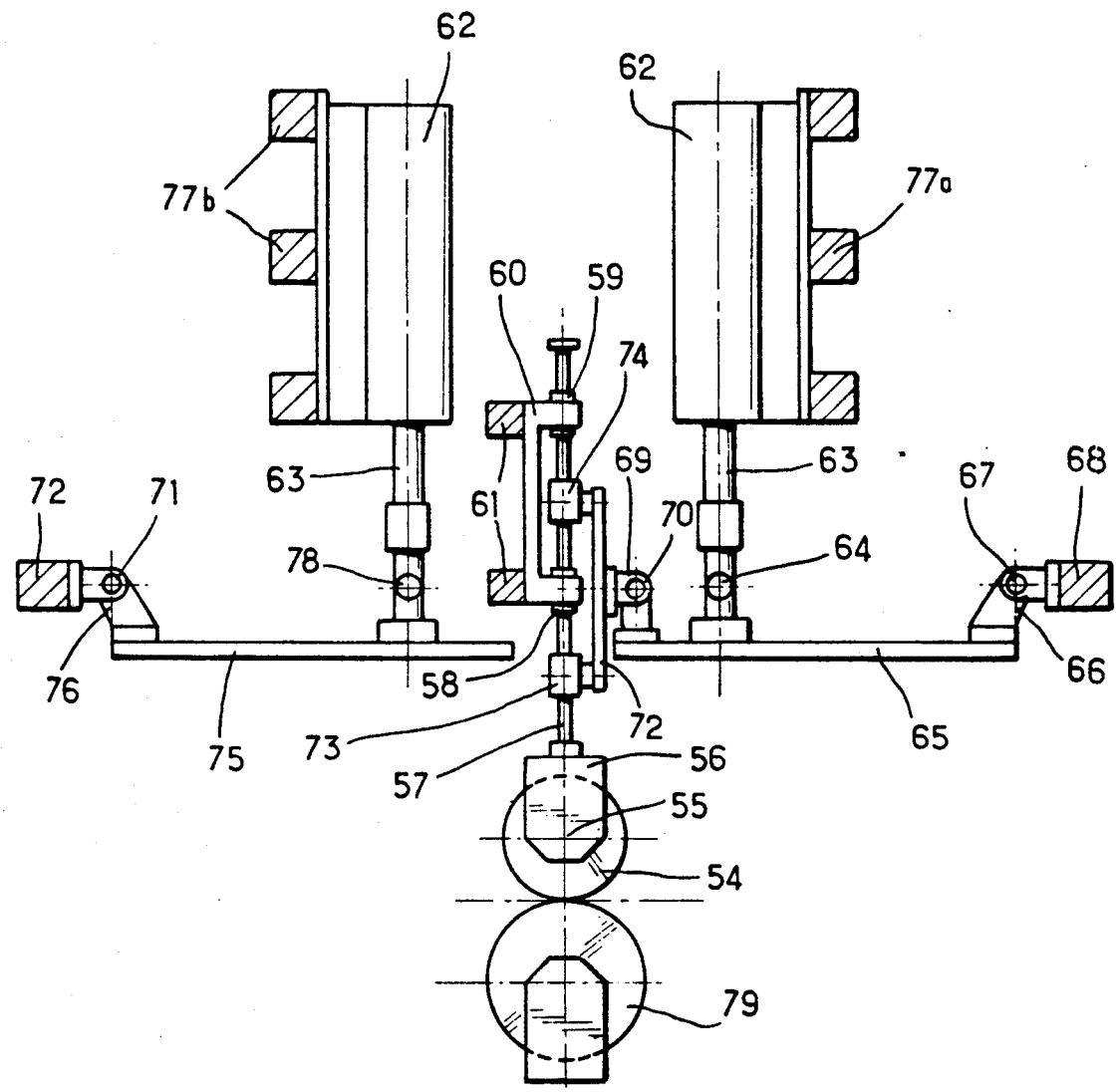
FIG. 3 shows a variant of an arrangement of two assemblies of pressing rollers mounted in alternating manner and in two planes.

FIG. 3 shows a variant of the installation of two pressing roller assemblies. In this variant the problem of the overall dimensions of the jacks for the pressing roller assemblies is solved by alternating the position of the jacks on the basis of two subassemblies in two planes parallel to the vertical plane of equilibrium of the apparatus and by associating with each jack an articulation system transmitting the force of the jack to the pressing roller with which it is associated.

Thus, the upper pressing roller 54 is mounted so as to rotate about an axis 55 carried by a fork or end 56 mounted at the end of a vertically sliding rod 57 guided in this movement by two bores 58, 59 in a support 60 fixed to a horizontal beam 61 belonging to the frame on which are mounted the upper and lower pressing assemblies. The raising-lowering movement of the pressing roller 54 is controlled by a pneumatic diaphragm jack 62 mounted on the beam 77a, whose rod 68 bears via an articulated fixture 64 on a lever 65, which is itself articulated on one side via a lug 66 about an axis 67 carried by a beam 68 integral with the frame. The other lever end is articulated about an axis 69 mounted in bore 70 of a support 71 carried by a plate 72 integral with the two rings 73, 74 fixed to the sliding rod 57.

The following (not shown) pressing roller is controlled by an identical system belonging to the other subassembly. Thus, the lever 75 is mounted in articulated manner via a lug 76 about the axis 71 carried by a beam 72 integral with the frame. The pressing action is controlled by the jack 62 fixed to the frame beam 77b, the jack rod 63 being attached to the lever 75 by an articulated fixture 78. Although not shown, the other end of the lever 75 is pivoted to a following pressing roller in the same way as the lever 65 is pivoted to roller 54. FIG. 3 only shows part of the lower pressing assembly incorporating the rollers 79.

Figure 4:
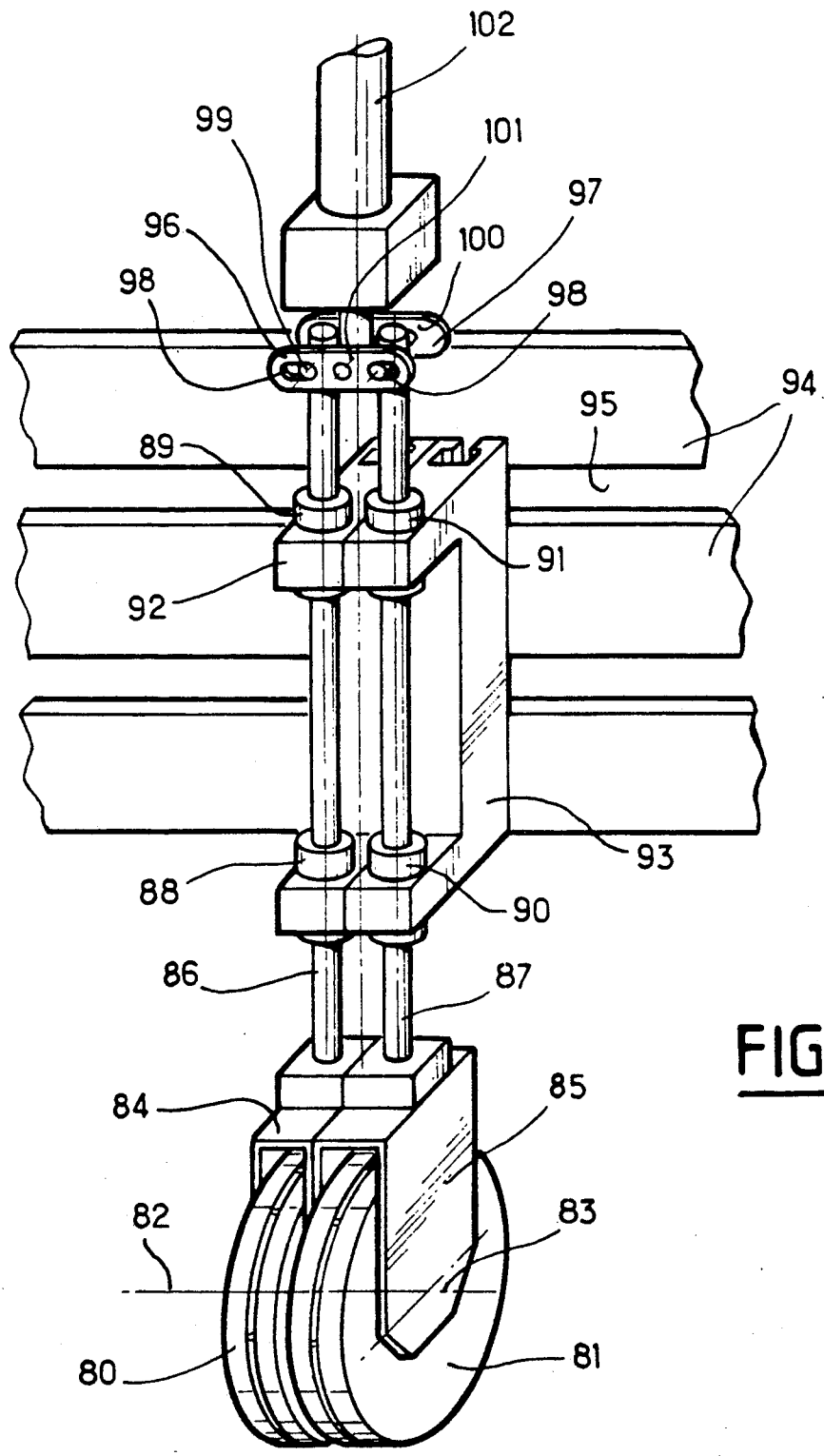
FIG. 4 shows part of the pressing assembly equipped with two rollers actuated by the same jack.

FIG. 4 shows an upper pressing element equipped with two rollers 80, 81 actuated by the same jack. The two rollers 80, 81 are mounted so as to rotate about spindles 82, 83 carried by fork ends 84, 85 mounted at the ends of two parallel rods 86, 87 sliding in the rings 88, 89, 90, 91 carried by the supports 92, 93, which are fixed to a beam 94 belonging to the calender frame. The beam 94 has grooves 95 permitting the regulation of the position of the supports 92, 93. The two rods 86, 87 are interconnected by two parts 96, 97 having oblong holes 98 traversed by the two spindles 99, 100. The two parts 96, 97 are mounted so as to pivot about an axis 101 carried by the end of the rod 102 of a (not shown) pneumatic jack. The assembly of the two rods 86, 87 are articulated while remaining parallel and at a fixed distance from one another. One roller can thus move vertically as compared with the other in the pressing direction by the pivoting of the parts 96, 97. This type of installation of the two rollers on the same jack makes it possible to double the number of rollers and increase the efficiency of pressing, particularly in the parts of the pressing line where there are very marked curvatures.

Figure 5:
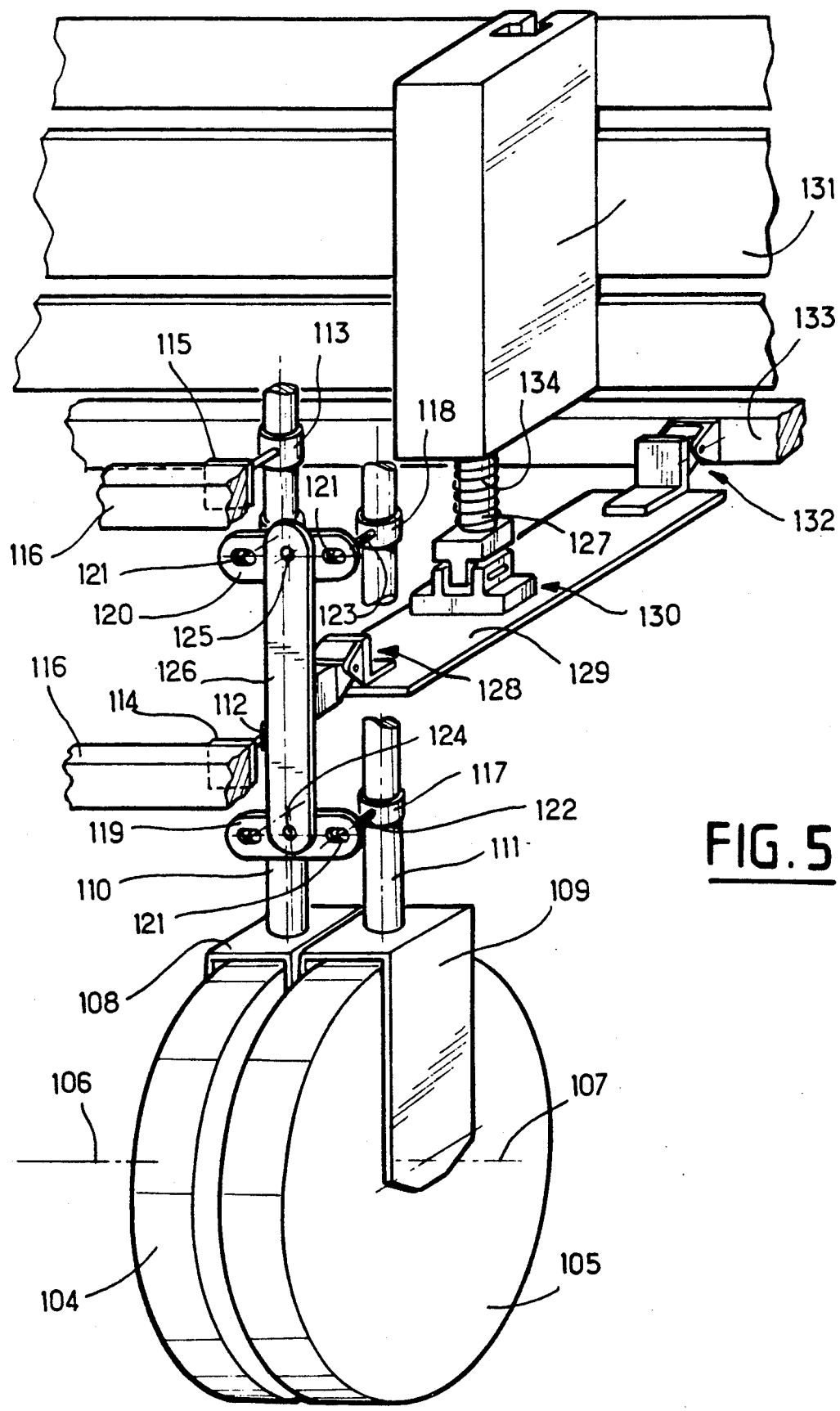
FIG. 5 shows a pressing assembly equipped with two rollers actuated by a jack positioned in a vertical plane differing from that of the pressing plane.

FIG. 5 shows an upper pressing element equipped with two rollers 104, 105 actuated by the same jack 103 which, as in the case of the apparatus described relative to FIG. 3, is installed in a plane parallel to the pressing plane and differing from the latter.

As before, the two rollers 104, 105 are mounted so as to rotate about axes 106, 107 carried by two fork ends 108, 109 mounted at the end of two parallel rods 110, 111, which slide in rings (only the rings 112, 113 of the rod 110 being shown) carried by the supports 114, 115 fixed to a beam 116 belonging to the calender frame. Rings integral with the two rods 110, 111 (only the rings 117, 118 integral with the rod 111 being shown) are mounted on parts 116, 120 having oblong holes 121 by means of axes 122, 123. The two parts 119, 120 are mounted so as to pivot about spindles 124, 125 carried by an intermediate part 126 attached to the rod 127 of the pneumatic jack 103 by an articulation system 128, a lever 129 and another articulation system 130 mounted at the end of the rod 127 of the jack 103, which is itself mounted on a beam 131. The other lever end is mounted via an articulation system 132 on another beam 133 belonging to the calender frame. A spring 134 for maintaining the distance between the jack and the articulation can be provided between the rod 127 of the jack rod 127 of the jack 103.

When the apparatus according to the invention is a calender having an assembly of upper rollers and an assembly of lower rollers, each of these assemblies is mounted as at least two subassemblies in different planes.

In a variant, the apparatus according to the invention comprises an assembly of lower pressing rollers, subdivided into subassemblies and it comprises an upper pressing means, a flexible cylindrical pressing roller extending over the entire useful width of the apparatus, the desired curvature of the pressing roller being supplied by the bearing action of an assembly of upper rolls, as described in European patent 0 015 209. In this variant, the assembly of upper rolls can also be subdivided into at least two subassemblies placed in different planes.

This apparatus is advantageously used for the production of asymmetrical glass plates formed from a flexible sheet and a rigid support, the cylindrical pressing roller pressing the flexible plastic sheet onto the rigid support.

In another variant, the pressing apparatus according to the invention comprises as an upper pressing means an assembly of upper pressing rollers mounted in accordance with the invention and subdivided into at least two subassemblies placed in two different planes and a form support adapted to the geometry of the glazing as the lower pressing means, whereby said support can be mounted so as to tilt about one or more horzontal axes.

A pressing apparatus using a form support is described in European patent 0 316 224. This apparatus can also be equipped with a flexible, cylindrical pressing roller when it is used for the assembly of asymmetrical glazings. In this case, the upper rolls or rollers, which bear on the flexible roller to give it the desired curvature, can be subdivided into at least two subassemblies placed in two different planes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for the assembly of laminated glazings by pressing, comprising:
   a frame;
   at least one set of pressing rollers extending in a direction crosswise to a direction of movement of the glazings relative to the apparatus; and
   a plurality of jacks mounted to the frame and connected to the pressing rollers for pressing the pressing rollers onto the glazings, wherein said jacks are arranged in at least two groups, each of said groups lying in mutually different and substantially vertical planes defined by the group of jacks and the respective associated set of rollers, at least one of said different planes being non-coplanar with a vertical plane including said pressing rollers, wherein jacks of said at least two groups alternate with one another in the crosswise direction.

2. An apparatus according to claim 1 wherein said pressing rollers are upper rollers, further comprisig lower rollers mounted on a plurality of said jacks.

3. An apparatus according to claim 1 wherein said mutually different planes are inclined with respect to the vertical plane.

4. An apparatus according to claim 1 wherein said mutually different planes comprise two planes symmetrically inclined with respect to said vertical plane.

5. An apparatus according to claim 1 including a joint connecting each of said jacks to two of said pressing rollers, said joint comprising means for permitting the two pressing rollers to move in a pressing direction independently of one another.

6. An apparatus according to claim 1 wherein said mutually different planes are parallel to one another, including articulated means connecting the jacks to the rollers supported thereby.

7. An apparatus according to claim 2 wherein said jacks are fluid operated jacks, including means for equalizing the fluid pressure in the jacks supporting said upper and lower rollers.

8. An apparatus according to claim 1 wherein said frame is mounted so as to pivot about a horizontal axis.

* * * * *